(12) United States Patent
Berg et al.

(10) Patent No.: US 6,474,150 B1
(45) Date of Patent: Nov. 5, 2002

(54) AIR BRAKE TEST DEVICE WITH REMOTE CONTROL

(75) Inventors: Norman A. Berg, Wheaton, IL (US); James F. Foster, Red Wing, MN (US)

(73) Assignee: Railway Research, Inc., Wheaton, IL (US)

( * ) Notice: Subject to any disclaimer, the term of this patent is extended or adjusted under 35 U.S.C. 154(b) by 32 days.

(21) Appl. No.: 09/665,146

(22) Filed: Sep. 19, 2000

(51) Int. Cl.[7] .................................................. G01L 5/28
(52) U.S. Cl. ........................................................ 73/121
(58) Field of Search ............................ 73/39, 121, 129

(56) References Cited

U.S. PATENT DOCUMENTS

| | | | | |
|---|---|---|---|---|
| 2,510,538 A | * | 6/1950 | Andrews ........................ | 73/39 |
| 3,872,711 A | * | 3/1975 | Atkinson et al. .............. | 73/39 |
| 4,847,770 A | | 7/1989 | Kane et al. ............. | 364/426.05 |
| 5,747,685 A | | 5/1998 | Skantar ........................ | 73/121 |
| 5,898,102 A | | 4/1999 | Skantar ......................... | 73/39 |

OTHER PUBLICATIONS

Time–O–Test₍ᵣ₎ Operating Manual, Railway Research, Inc., Wheaton, Illinois.

* cited by examiner

*Primary Examiner*—Benjamin R. Fuller
*Assistant Examiner*—Maurice Stevens
(74) *Attorney, Agent, or Firm*—Joan I. Norek; The Law Office of Joan I. Norek

(57) ABSTRACT

A testing device for conducting the Initial Terminal Inspection of the air brake system of a made-up train includes a first valve assembly for at least charging and applying the brakes through the test device operable from the location at which the device is coupled between the train brake pipe and a supply of compressed air, and it also includes a second valve assembly for releasing the brakes actuated by receipt of a remotely-transmitted signal. The Initial Terminal Inspection requires that the brakes of a train be inspected in both their applied and their released positions. A testing device is normally connected to the train brake pipe at the locomotive end. The inspection of the brakes in their applied position requires the inspector to walk the length of the train, usually from the locomotive end to the far end of the train. This can be a distance of a half mile or a mile or more. When the inspector reaches the far end of the train, completing the inspection of the brakes in their applied positions, the release of the brakes can be triggered by transmitting a signal to the second valve assembly from the inspector's remote location at the end of the train. The signal is received by the second valve assembly, for instance at a solenoid valve within the second valve assembly. Upon this release of the brakes, the inspector returns to the locomotive end of the train, inspecting the brakes along the route.

20 Claims, 7 Drawing Sheets

( PRIOR ART COMPONENTS )

(PRIOR ART COMPONENTS)

( PRIOR ART COMPONENTS )

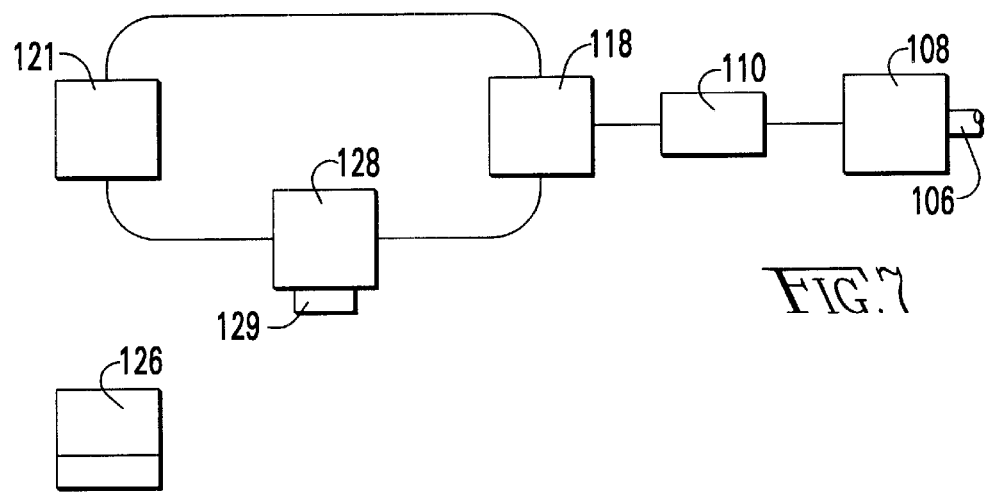

AIR BRAKE TEST DEVICE WITH REMOTE CONTROL

BACKGROUND OF THE INVENTION

The Federal Railroad Administration Regulations (49 CFR Ch. II, § 232.12) requires railroad train inspections which include the testing of a train's air brakes via a procedure known as the Initial Terminal Inspection. Railway car brakes and locomotive brakes have air-brake systems. Each of these air-brake systems includes an auxiliary pressurized air reservoir and a brake pipe. The brake pipes of a plurality of cars and the locomotive are interconnected by means of flexible coupling hoses to provide a continuous air passage, known as the train air brake pipe or simply train brake pipe, extending from the locomotive to the last car of a made-up train. The train brake pipe is closed at the rear end of the train. A brake valve, usually located in the locomotive, controls the charge of compressed air from a main reservoir to the train brake pipe. The normal brake operating pressure retains the brakes of all the cars and the locomotive in a released or inoperative position. When the pressure in the train brake pipe is reduced from the normal operating pressure, all of the brakes of the train are applied and remain in the applied or operative position until the normal brake operating pressure is restored.

The brakes of each railway car must be tested and inspected when a train is assembled at a terminal to determine whether or not the brakes are properly applied and properly released under respectively reduced and normal operating pressures. This can advantageously be accomplished using a time-testing or clock release test device. In bief, with the cars of a train and the train brake pipe assembled (but normally without addition of a locomotive), the train brake pipe is charged to the desired pressure through the test device and then, with the train brake pipe closed to both the air supply and the air exhaust, the inspector watches a pressure gauge to determine brake pipe leakage. If the system is within permissible leakage tolerances, and with the pressure set to the brake application level, the inspector walks down the length of the train, examining the brakes of each car to assure that all brakes are in proper working order and that all brakes are in the set or applied position. Then the clock release test device, which has been preset to the estimated time required to walk the length of the train while examining each of the brakes, effectuates the restoration of normal operating pressures, triggering the release of the brakes. The inspector then returns, walking back up the length of the train, now examining the brakes of each car to assure that all are in the proper released position.

An unrefined embodiment of the time testing or clock release test device described in brief above is the subject of, and is described further in, U.S. Pat. No. 2,510,538, issued Jun. 6, 1950, inventor E. E. Andrews, the disclosures of which are incorporated hereinto. A much-refined commercial embodiment of such a clock release device, sold under the trademark TIME-O-TEST® by Railway Research, Inc. of Wheaton, Ill., has been, and well remains, on the market. There are hundreds or thousands of TIME-O-TEST® test devices in active daily use in commercial railroad yards. The TIME-O-TEST® device permits an inspector to examine each of the brakes in both the applied and the released positions with a single walk down the length of the train and a single return back up the length of the train. When test devices without a timed control mechanism for switching the pressure are used, the inspector must return to test device in between the applied and the released brake examinations, which requires walking the length of the train four times. The TIME-O-TEST® test device is connected to the brake pipe of a made-up train at the open, "locomotive end" of the brake pipe. (As noted above, the brake pipe is closed at the rear of the train.) It typically uses the yard's compressed air supply, rather than compressed air from a locomotive, and thereby the brake test on the cars can be, and normally is, conducted without bringing over an expensive locomotive or crew therefor.

Although the TIME-O-TEST® clock release device functions very satisfactorily in most circumstances, there are situations in which the length of time required to walk the length of the train while conducting the first series of brake inspections is either not known or inadvertently does not sufficiently match the preset time for pressure restoration. If the brake release is triggered too early, that is before the completion of brake inspection in the set position, the inspector must return and reset the test device. If the brake release is set to be triggered only after too long of an elapse of time, an inspector might well be required to wait a significant length of time at the far end of the train for the brake release to be triggered.

It would be advantageous to efficiently and safely interface a remote control means to activate the triggering of the brake release, permitting an inspector to control the air brake test valve from various locations along the length of a train, particularly from the far end of a train after the inspector has completed a first series of brake examinations and is ready to start the second series.

BRIEF SUMMARY OF THE INVENTION

The invention is an air brake testing apparatus comprising a supply of compressed air, an air line for establishing fluid communication between the compressed air supply and a train brake pipe of a line of coupled train cars whose air brakes are to be tested, a first valve assembly movable between a first position opening the air line for releasing the brakes and a second position closing the air line for applying the brakes, and a second valve assembly movable upon receipt of an input signal from a remote signal transmitter to an activated position actuating the movement of the first valve assembly from the second position to the first position. The present invention also includes a method of inspecting the air brakes of a made-up train employing an air brake testing apparatus of the invention.

BRIEF DESCRIPTION OF THE SEVERAL VIEWS OF THE DRAWING

FIG. 7 is schematic diagram of the remote control assembly of the test device of FIG. 1.

DETAILED DESCRIPTION OF THE INVENTION

Figure 1:
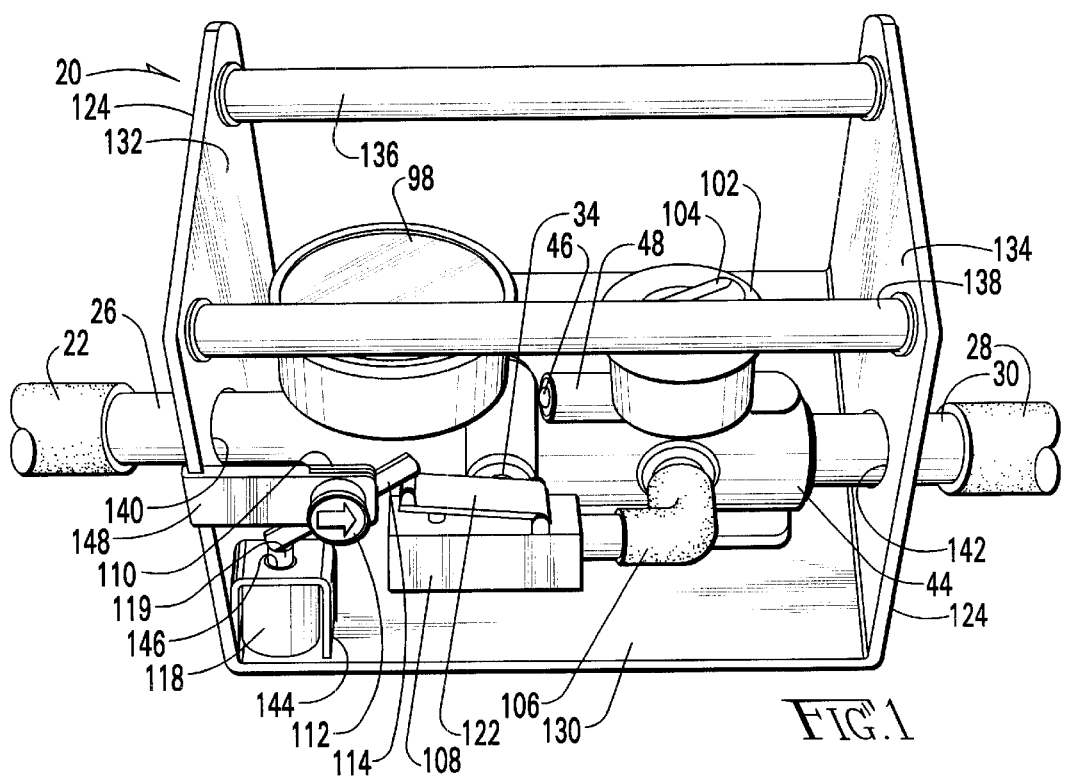
FIG. 1 is a partially diagrammatic perspective view of a test device of the invention in its coupled operational state.
Figure 2:
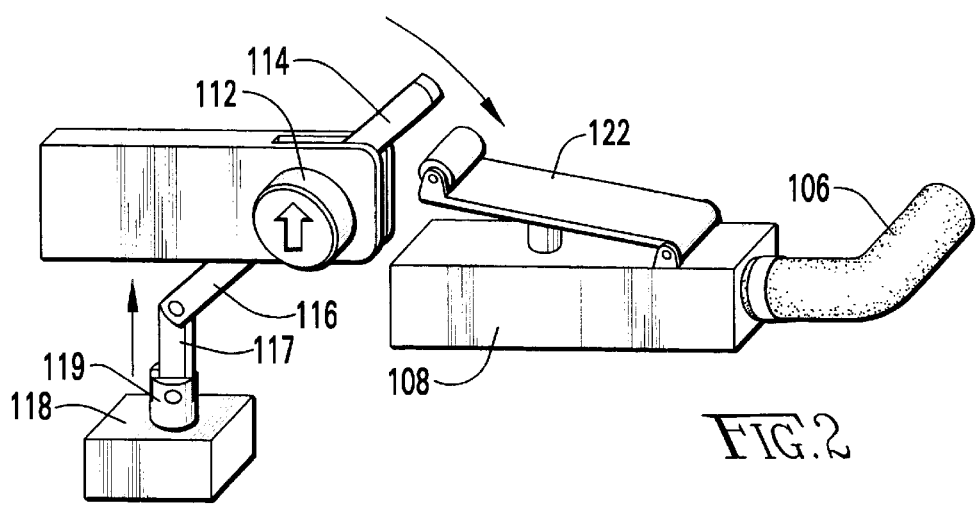
FIG. 2 is a diagrammatic view of the solenoid, latch switch and air valve components of the remote control assembly of the test device of FIG. 1 in the open or unarmed position.
Figure 3:
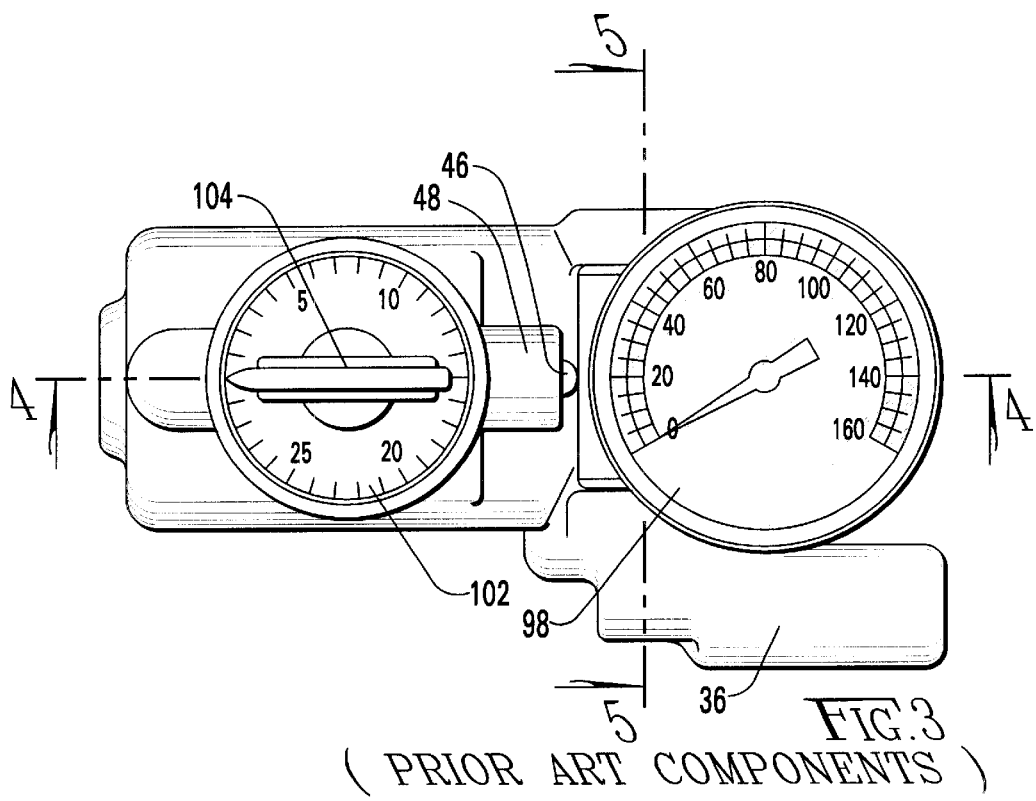
FIG. 3 is a partially diagrammatic plan view of the core timer-controlled prior art components of the test device of FIG. 1.
Figure 4:
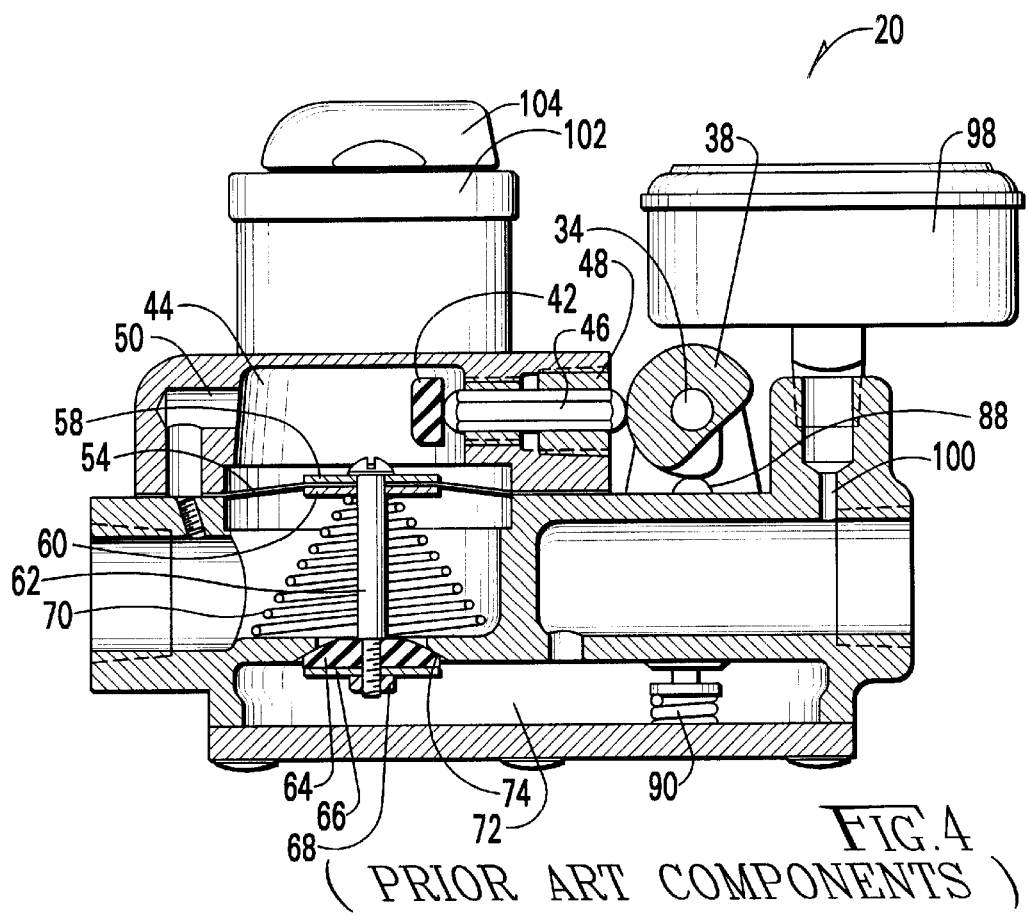
FIG. 4 is a side section view of the core timer-controlled prior art components of test device of FIG. 1, taken along line 4—4 of FIG. 3.
Figure 5:
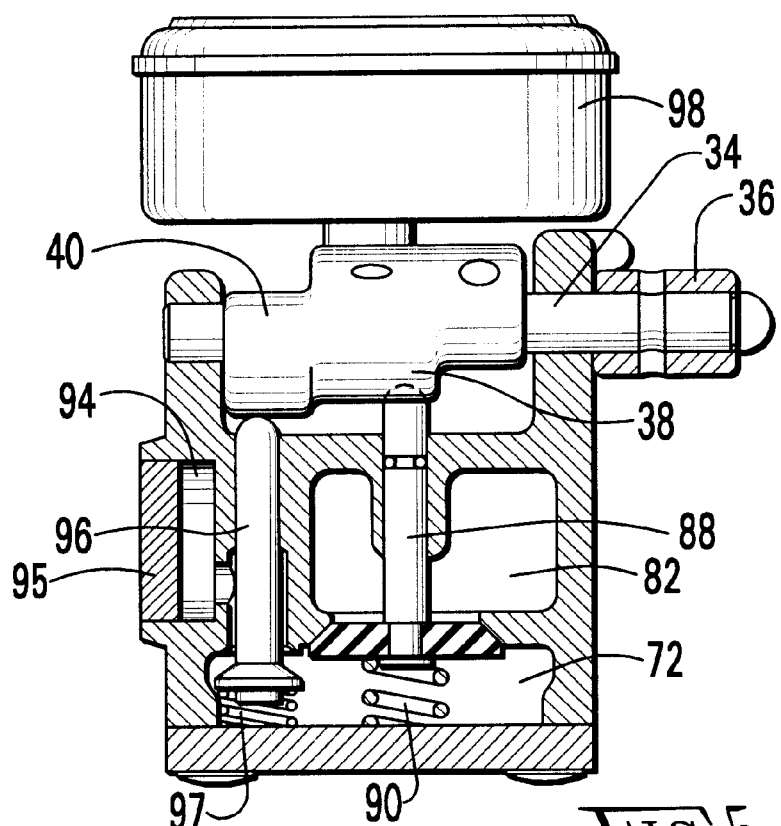
FIG. 5 is a side section view the core timer-controlled prior art components of the test device of FIG. 1, taken along line 5—5 of FIG. 3.
Figure 6:
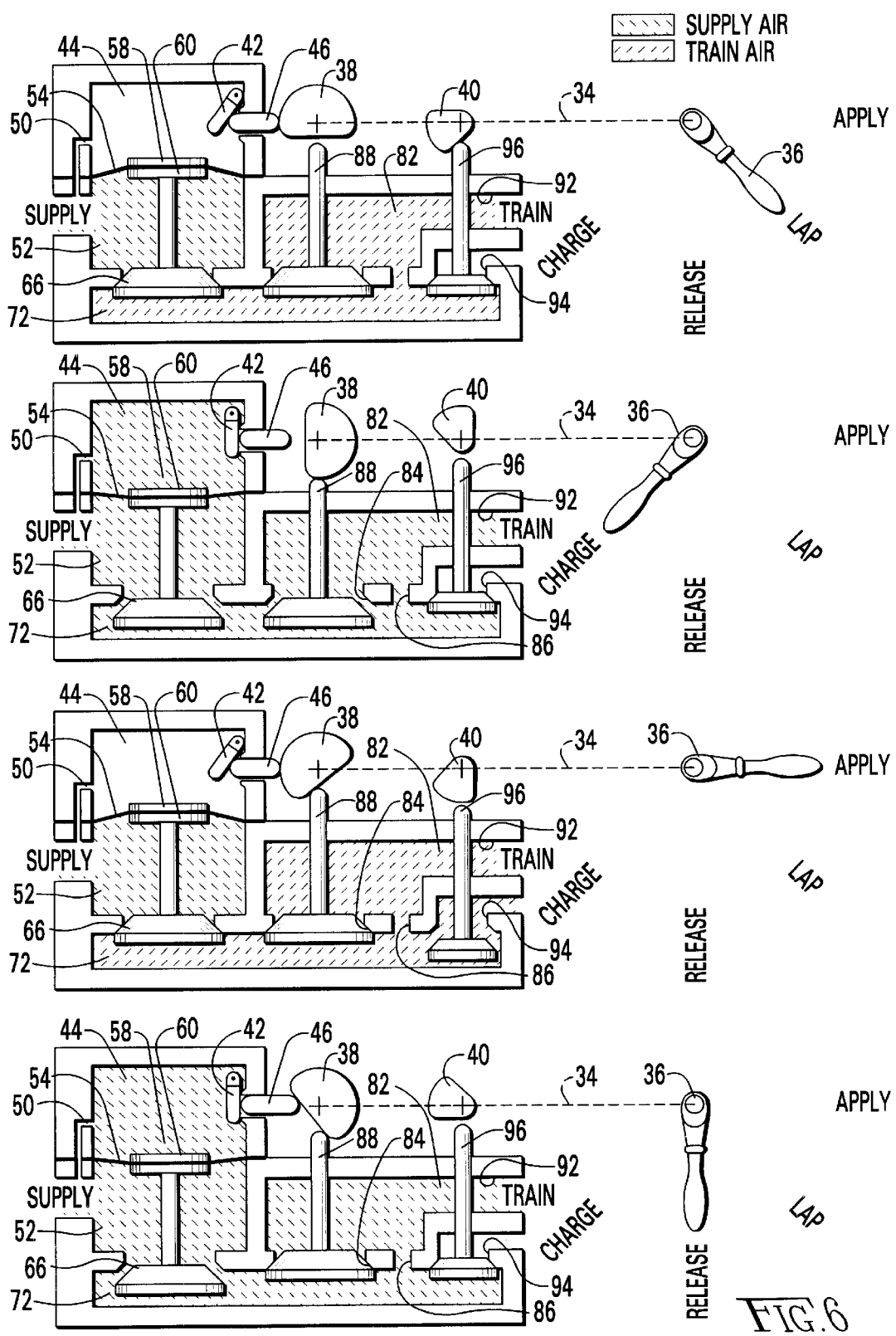
FIG. 6 is a series of air-flow versus operational position diagrams of a test device of the invention.

Referring to FIGS. 1 to 7, there is shown a remote-controlled air brake test device of the present invention, designated generally by the reference number 20. At the "train end" of the test device 20, the test device 20 is coupled to a train brake pipe 22 of a train (not shown) by a conventional air brake hose coupling 26. At the "supply end" of the test device 20, the test device 20 is fitted to the yard's compressed-air supply line 28 by a conventional hose coupling 30 (which could also be suitable piping). The test device 20 is coupled to the train brake pipe 22 at the locomotive end of the train as is conventional for conducting an initial terminal air brake test.

The test device 20 has a selector-handle assembly which is comprised of a cam shaft section (or simply "cam shaft") 34 and a selector-handle section (or simply "selector handle") 36 affixed to the cam shaft 34 for rotation therewith. Carried on the cam shaft 34 for rotation therewith are a first cam element 38 and second cam element 40. The selector handle 36 has four indicated positions, namely a charge position, a lap position, an apply position, and a release position, each of which positions provides a predetermined orientation of the cam shaft 34 and its first and second cam elements 38, 40.

The test device 20 includes a pilot valve assembly which comprises a normally-closed pilot valve member or flapper valve 42 mounted within a control-air chamber 44, and a spring-loaded pilot-valve follower or detent follower 46 slidably mounted within the orifice of a pilot valve bushing 48. (As will be seen from the description below, the flapper valve 42 is open only when the first cam element 38 moves the pilot-valve follower 46 inward into the control-air chamber 44 or when another component affirmatively holds the flapper valve 42 out in an open position from within the control-air chamber 44.) The control-air chamber 44 is open to the compressed-air supply line 28 via a 0.040 inch diameter orifice 50. Below the control-air chamber 44 is a supply-air chamber 52. The compressed air supply line 28 opens into the supply-air chamber 52. A diaphragm 54, and release valve components mounted thereon, isolates the control-air chamber 44 from the supply-air chamber 52. The diaphragm 54 is a molded piece formed of rubber or rubber-like fabric of sufficient elasticity or flexibility. The diaphragm 54 is secured and sealed about its entire outer perimeter to or within the test-device body 56 of the test device 20 and is secured and sandwiched between upper and lower piston head members 58, 60 comprising a first piston head 61, punctuated by a headed release-valve stem or screw 62. A release valve element 64 is mounted on the lower end of the release-valve stem 62, and is seated upon a second piston head 66. The release valve element 64 and second piston head 66 are secured from below on the release-valve stem 62 by a locknut 68.

Below the supply-air chamber 52 is a first charging chamber 72. The supply-air chamber 52 and first charging chamber 72 are open to each other (when the release valve is open) via a release-valve port 74 in the test-device body 56. The release valve element 64 has a beveled upper shoulder 78 that releasably meets an annular lower port lip 80, closing the release-valve port 74. A release-valve spring 70 is seated within an annular depression (not shown) on the upper shoulders of the release-valve port 74, and runs upward, spiraling around the release valve stem 62, to abut the under-surface of the first piston head 61. The release-valve spring 70 maintains a constant upward force upon the first piston head 61, which normally holds the release valve element 64 against the port lip 80, closing the release-valve port 74 and shutting off fluid communication between the supply-air chamber 52 and the first charging chamber 72. Therefore when the release valve is closed, there is no fluid communication between the compressed air supply line 28 and the first charging chamber 72. When sufficient air pressure builds up in the control-air chamber 44, its pressure down upon the diaphragm 54 and first piston head 61 sufficiently overrides the release-valve spring 70, whereby the release valve opens (the release valve element 64 and the second piston head 66 being forced away from the port lip 80), providing fluid communication between the compressed air supply line 28 and the first charging chamber 72.

In an initial terminal air brake test, the train brake pipe 22 is first charged to the desired pressure, which is accomplished through the test device 20 with the selector handle 36 at the charge position. In the charge position, the first cam element 38 is spaced from the pilot-valve follower 46, allowing the flapper valve 42 to close, whereby the air pressure in the control-air chamber 44 increases as compressed supply air enters through the orifice 50 into the closed chamber 44. (When the flapper valve 42 is open, the flow of supply air into the chamber 44 is balanced by the escape of air out of the chamber 44 through one or more orifices in or about the pilot valve bushing.) The release valve then opens, providing fluid communication between the supply-air chamber 52 and the first charging chamber 72. The first charging chamber 72 is in turn open to a second charging chamber 82 through a first charging-chamber port 84 and a second charging-chamber port 86. The second charging-chamber port 86 is a normally-open port. The first charging-chamber port 84 is opened, providing greater fluid communication between the first charging chamber 72 and second charging chamber 82, by the opening of a charging valve 88. The charging valve 88 is pressed downward overriding the upward force of a charging-valve spring 90 by the first cam element 38 as it was rotated into its charge position. The second charging chamber 82 is open to the train brake pipe 22 via a train-pipe port 92. The first charging chamber 72 has a vent or exhaust port 94 (equipped with a screen or diffuser 95) which, in the charge position, is closed by a vent or exhaust valve 96 seated on a vent-valve spring 97. The charging-valve spring 90 and the vent-valve spring 97 are in turn seated upon a bottom cover plate 57. A pressure gauge 98, mounted above the second charging chamber 82, is in fluid communication with the second charging chamber 82 via a gauge port 100. Therefore, in brief, when the test device 20 is in the charge position, there is fluid communication between the compressed air supply line 28 (ultimately from yard air supply, not shown) and the train brake pipe 22, which increases the air pressure within the train brake pipe 22. The pressure is monitored with the pressure gauge 98 positioned immediately upstream of the train-pipe port. In the charge position, the flapper valve 42 is closed, the release valve and the charging valve 88 are open, and the vent valve 96 is closed. A complete fluid communication way between the compressed air supply line 28 and the train brake pipe 22 is provided, and the pressure in the second charging chamber 82 can be monitored via the pressure gauge 98 as it rises.

When the pressure in the second charging chamber 82 rises to the desired level, the selector handle 36 is turned to the apply position to cause a pressure reduction in the train brake pipe 22 and brake application. In the apply position, the first cam element 38 has moved the pilot-valve follower 46 inward, opening the flapper valve 42. Upon the opening of the flapper valve 42, pressurized air vents from the control-air chamber 44 and the release valve closes. The first cam element 38 also releases the charging valve 88 and the charging valve 88 closes. The second cam element 40 has been rotated to the orientation at which it presses the vent valve 96 downward, opening the vent port 94. The train brake pipe 22 is therefore open to the vent port 94 in the apply position. Pressurized air from the train brake pipe 22 flows back into the second charging chamber 82 and into the first charging chamber 72, and out the vent port 94. Upon this reduction of pressure in the train brake pipe 22, the brakes are applied along the length of the train.

Then the selector handle 36 is moved to the lap position. The second cam element 40 releases the vent valve 96 and the vent valve 96 closes. The train brake pipe 22 remains open to the second charging chamber 82 (which is open to the pressure gauge 98). The first cam element 38 continues to hold the flapper valve 42 open, which maintains the release valve in a closed position, so that the compressed air supply line 28 continues to be closed off. (The first charging chamber 72 is closed to the supply-air chamber 52 and thus is closed to the compressed air supply line 28.) The charging valve 88 remains closed. In this lap position, the pressure gauge 98 is monitored to determine the extent to which the train brake pipe 22 holds the air pressure, and thereby to determine brake pipe leakage. If further reduction in air pressure is desired, the selector handle 36 can be moved to the apply position and then back to this lap position.

If the system is determined to be within permissible leakage tolerances, the next procedures required of the inspector are the examination of each of the brakes along the length of the train first in their applied positions, and then in their released positions. During the first examination the inspector will walk from brake to brake, starting with the locomotive end of the train and ending at the rear end of the train. A train having about a hundred cars can be about a mile long, and trains having thirty-five or forty cars are still significantly long. The test device 20 as shown is capable of operation in a conventional mode. The test device 20 includes a timer 102 with a timer selector 104. (Conventional test devices of this type are commonly commercially provided with timers that can be set for up to thirty or sixty minutes.) In the conventional mode, the timer 102 is set while the selector handle 36 is still in the lap position. The timer 102 (via an actuator arm, not shown) holds the flapper valve 42 in an open position until the end of the set time interval. After the desired time is set, the selector handle 36 is moved to the release position. In the release position the vent valve 96 and the release valve remain closed, and the first cam element 38 releases the pilot-valve follower 46. (Without the timer 102 holding the flapper valve 42 open, this release of the pilot-valve follower 46 would cause the flapper valve 42 to close and thus the release valve to open. The timer 102 is therefore delaying the opening of the release valve.) The inspector then walks down the length of the train and examines each of the brakes in their applied position. When the end of the train is reached, the inspector waits for the automatic release of the brakes. Upon the elapse of the set time duration, the timer 102 releases the flapper valve 42. Since the selector handle 36 is already in the release position, the pilot-valve follower 46 is free to move, and the flapper valve 42 closes, opening the release valve. The second charging chamber 82, and hence the train brake pipe 22, is open to the first charging chamber 72 through the second charging-chamber port 86, and the first charging chamber 72 is open to the supply-air chamber 52. The air pressure in the train brake pipe 22 therefore rises, releasing the brakes. The inspector then returns, walking back up the length of the train to the locomotive end, inspecting each of the brakes in their released position on the way. The brakes of the cars have therefore been inspected both in their applied position and then in their release position, although the inspector only walked down the length of the train and then returned to the locomotive end of the train.

The above-described conventional operation of the test device saves considerable time and effort. Without the timer 102 forestalling the closing of the pilot valve 48 and hence forestalling the actuation of the brake release position, an inspector would be required to return the entire length of the train to change a test device to the release position, and thereby walking the length of a train four times while conducting the pair of brake examinations. The conventional operation of the test device nonetheless has drawbacks. An inspector can only set a timer to the anticipated inspection time, possibly adding some leeway. If for one reason or another the actual inspection time takes longer than anticipated, and the brakes are released before completion of the brakes in their applied position, the inspector must return to the test device 20 to reset it, and start the inspection again from the beginning. On the other hand, if the time set is longer than the actual inspection time, the inspector must wait at the far end of the train for the release of the brakes. If instead the remote-control operation of the test device 20 is employed, there is no risk of having the brakes released until the inspection of the brakes in their applied position is completed, and there is no undesired delay after that completion. Instead, the inspector activates the release of the brakes from the far end of the train when he is ready to begin the walk back up the length of the train.

In preferred embodiment, a test device of the present invention includes all conventional-operation components in operational condition so that the device can be used in the conventional manner if preferred, or if for one reason or another the remote-control operation of the device is not desired or not possible. In preferred embodiment, a test device of the present invention is a retrofitted conventional-operation test device, discussed in more detail below.

The test device 20 is provided with a remote-control assembly which interfaces a remote triggering procedure efficiently and safely. The remote-control assembly permits the closure of the pilot valve to be triggered from a remote location using almost any remote control signal transmitter, particularly any remote control electrical signal transmitter. Since the pilot valve is the same as the one employed in the conventional operation of the test device 20 as described above, the test device 20 can be employed either under conventional (timer) operation or under remote control operation. Under either brake-release triggering operation, the pilot valve assembly closes, which permits air pressure to build up in the control-air chamber 44, whereby the diaphragm 54 is depressed downward opening the release valve 64 and thus opening fluid communication between the train brake pipe 22 and the compressed air supply line 28.

The remote control assembly is comprised of an air duct or tube 106, such as a piece of threaded metal piping as shown, which is tapped into the control-air chamber 44 from the side. The air duct 106 provides fluid communication between the control-air chamber 44 and an air valve 108. The air valve 108 can be for instance a three-way general purpose valve such as is available from McMaster-Carr of Chicago, Ill. under the order code of #6464K13, with its bottom exhaust hole blocked off. Beyond the air valve 108 is a mechanical switch 110, such as the ¼-turn latch switch shown, available from McMaster-Carr under the order code of 1702A 41. The mechanical switch 110 has a rotary knob 112 and a first arm member 114 mounted for rotation with the rotary knob 112. To this mechanical switch 110 is added a second arm member 116, mounted 180° relative the first arm member 114. The second arm member 116 is connected by a tie member 117 to a pull-type solenoid 118 having an extendible plunger or arm 119 terminating in a connection station 120 to which the opposite end of the second arm member 116 is connected. This remote operation effectuates (without the timer 102 holding the flapper valve 42 open) the maintenance of the pilot valve in an open position (and thus the release valve closed), and then the controlled closing of the pilot valve and opening of the release valve, whereby the brakes are released from an applied position. After the monitoring of the pressure with the test device 20 in the lap position, as described above, the remote-control mechanisms are set to delay the closing of the pilot valve, whereby the solenoid 118 is manually set in an on position in which the control-air chamber 44 is vented through the air valve 108 via the air duct 106, as follows. The rotary knob 112 of the mechanical switch 110 is turned clockwise by one-fourth of a turn (90° or from the 12 o'clock position to the 3 o'clock position), which rotates the first arm member 114 downwardly to the point where the air-valve lever 122 is depressed while rotating the second arm member 116 upwardly, pulling up the solenoid arm 119. (Again, the solenoid arm 119 is connected to the second arm member 116 through the tie member 117.) The depressing of the valve lever 122 on the normally-closed air valve 108 opens the air valve 108 and thus bleeds air out of the control-air chamber 44. After these remote-control mechanisms are manually set, the selector handle 36 of the test device 20 is moved to the release position. In the release position the vent valve 96 and the release valve remains closed, and the first cam element 38 releases the pilot-valve follower 46. Because the timer 102 is not set, the flapper valve 42 closes, but the release valve does not open because air is escaping from the control-air chamber 44 through the air valve 108. The inspector then walks down the length of the train and examines each of the brakes in their applied position. When the end of the train is reached, the inspector transmits a signal from his remote position which activates (energizes) the solenoid 118. Upon such activation of the solenoid 118 via the electrical signal transmitted from the inspector's remote location, the solenoid arm 119 retracts, pulling down the second arm member 116 and thus forcing the counterclockwise rotation of the mechanical switch 110. (Again, the tie member 117 bridges the vertical movement of the solenoid arm 119 and the arcuate movement of the second arm member 116.) The first arm member 114 thus is moved away from the valve lever 122, releasing the valve lever 122 from its depressed position and the air valve 108 returns to its normally-closed position. The closing of the air valve 108 seals the control-air chamber 44, which in turn leads to a pressure build-up in the control-air chamber 44, depressing the diaphragm 54, opening the release valve 64. Since the selector handle 36 is already in the release position, the pilot-valve follower 46 is free to move, and the flapper valve 42 is closed. The second charging chamber 82, and hence the train brake pipe 22, are open to the first charging chamber 72 through the second charging-chamber port 86, and the first charging chamber 72 is opened to the supply-air chamber 52 when the release valve opens. The air pressure in the train brake pipe 22 therefore rises, releasing the brakes. The inspector then returns, walking back up the length of the train to the locomotive end, inspecting each of the brakes in their released position on the way.

The solenoid 118 when energized is of course brought into electrical communication with a voltage source (power source), such as the 12 volt battery 121 as shown. The power source could be a battery (the system can be adapted to any selected voltage), a solar cell, AC current, or AC-to-DC transformer. The solenoid 118 is a mono-action valve. It has an "on" position at which the arm 116 is extended and an "off" position with the arm 116 in a retracted position, triggering the sealing of the control-air chamber 44 as described above. The wireless remote control is, as noted above, activated by a control signal generated and sent by a transmitter. The control signal may be an audio, radio, or light (visible or preferably infra-red) energy and transmitted through the air. The control signal sent by the transmitter may be a carrier signal which modulates either a continuous waveform or a sequence of spaced apart pulses, which pulses can be coded. The transmitted energy of the carrier signal is converted at a transducer into electrical signals. In the case of an RF signal, the transducer is likely to be a radio receiver 128 as shown. In the case of an audio signal, the transducer is a microphone, and in case of a light signal, the transducer is typically a photo-diode, a photo-resistor or a photo-transistor. Since railroad inspectors are typically already outfitted with radio transmitters, the use of a radio signal is convenient. To transmit the carrier signal, the inspector will simply manually activate a switch, such as pressing a button, on the transmitter 126.

As mentioned above, there are hundreds or thousands of TIME-O-TES® test devices in active daily use in commercial railroad yards. These devices are both fairly expensive and very effective in performing the Initial Terminal Test. They are also already portable and equipped with the timer mechanism for timed-release of the brakes. In preferred embodiments of the invention, the TIME-O-TEST® test device (or any like test device) can be simply and effectively retrofitted by the addition of the remote control mechanisms, rather than replacing these test devices. As shown in the drawings (which at least diagrammatically follows the actual configuration of a TIME-O-TEST® test device), a threaded bore through to the control-air chamber 44 can easily be formed and the air duct 106 threaded thereinto in conventional fashion. No other modification of existing components of a TIME-O-TEST® test device are required. The other components of the wireless remote control system are added externally to the TIME-O-TEST® test device, such as by simply mounting them at the side of the TIME-O-TEST® test device. These additional components do not interfere with the operation of the selector handle 36, nor with the reading of the pressure gauge 98, which is mounted on top, facing upward. The additional remote-control components also do not interfere with the setting and use of the existing timer 102, which is also mounted on top, facing upward. In these preferred embodiments, the remote-control mechanisms are also particularly safe. No damage would ensue even if both the timer and remote-control mechanisms were set. Although it is difficult to envision any practical reason for setting both mechanisms, one cannot completely rule out that happening inadvertently. If so, the control-air chamber 44 would be vented by the holding-open of both the flapper valve 42 and the air valve 108, which would not cause any damage. If the timer triggered the closing of the flapper valve 42 before the remote signal was transmitted, the control-air chamber 44 would continue to be vented by the holding-open of the air valve 108, and there would be no premature release of the brakes prior to the transmission of the remote signal. If on the other hand the remote signal were transmitted before the timer triggered the closing of the flapper valve 42, the control-air chamber 44 would continue to be vented by the holding-open of both the flapper valve 42 until it is closed by the timer. The latter situation would only delay the inspector somewhat while waiting at the end of the train for the brake release. The fact that brake release had not occurred would be apparent.

A suitable remote-control electric signal transmitter is preferably, but not necessarily, sufficiently portable to permit it to be readily carried by an inspector, preferably in a pocket or other convenient carrier so that the inspector's hands are normally free. In the embodiment shown, the remote-control signal transmitter 126 is a small hand-held two-way radio of the type already commonly used by inspectors, and the remote-control assembly further includes a tone decoder 129. Suitable decoders are commercially available, for instance that available from Motron Electronics of Eugene, Ore. as AK-4C. A tone decoder is connected to a commonly available relay which when activated allows current to flow through the solenoid. A suitable radio is that sold as "Talkabouts" available from Motorola of Schaumburg, Ill. Suitable tone generators include that available from Radio Shack of Fort Worth, Tex. as model #43-14S A. This preferred assembly permits each test device to be matched with a specific radio. Such an setup precludes an accidental brake release by another inspector in the vicinity who is transmitting a signal to a different test device.

The test device 20 preferably is outfitted with an outer housing 124 on or within which the core components of the remote control assembly can be securely mounted in fixed relation to the components mounted on or within the test device body 56. In preferred embodiment, the outer housing 124 permits the portability characteristics to continue despite the inclusion of a remote-control assemblage of components. The outer housing 124 is preferably comprised of three wall members and two braces, namely a base member 130, first and second end members 132, 134, and a first and second arm members 136, 138, the end members 132, 134 extending upward from opposite ends of the base member 130, and the arm members 136, 138 straddling the end members 132, 134, each separately running from the upper corner of one end member to the opposite upper corner of the other end member, substantially parallel each other. These structural members are connected where they meet by conventional mechanical fasteners. The arm members 136, 138 are preferably tubular in cross section configuration or are of other suitable cross section configuration to provide convenient upper carrier handles in additional to providing upper structural integrity. The arm members 136, 138 are sufficiently spaced-apart to maintain the viewability of, and ready access to, the pressure gauge 98 and the timer 102 from the top of the outer housing 124. The end members 134, 136 are each provided with apertures 140, 142 sufficiently large for ready connection, and disconnection, of respectively the air brake hose coupling 26 and the hose coupling 30 for the compressed air supply 28. The body of the solenoid 118 is seated within a corner housing 144, which in turn is affixed to either or both of the base member 130 and the first end member 132. The arm 119 extends through an aperture 146 in the top of the corner housing 144. The sides and top of the outer housing 124 therefore are substantially open. The air valve 106 and mechanical switch 110 are held at elevated positions above the base member 130 by a bracket 148 extending from the first end member 132, which bracket 148 can be a simple right angle brace as shown or the like. The power source, such as the 12 V battery, and accompanying components of the electrical system, such as receiver and relay, can be simply mounted and transported within a separate suitcase (not shown) or other like carrier and connected with a conventional cord to the solenoid for electric communication therewith.

The invention thus in broad embodiment is an air brake testing apparatus comprising a supply of compressed air, an air line for establishing fluid communication between the compressed air supply and a train brake pipe of a line of coupled train cars whose air brakes are to be tested, a first valve assembly movable between a first position opening the air line for releasing the brakes and a second position closing the air line for applying the brakes, and a second valve assembly movable upon receipt of an input signal from a remote signal transmitter to an activated position actuating the movement of the first valve assembly from the second position to the first position. In preferred embodiment, the second valve assembly has an air valve which moves from an open position to a closed position upon receipt of the input signal. Within the second valve assembly the signal is preferably received at an electro-mechanical valve, such as a solenoid valve. In preferred embodiment and as shown, the first valve assembly has a normally-closed release valve which is actuated by a pilot valve, whereby the release valve opens, opening the air line. The pilot valve in turn being actuated by the second valve assembly.

In preferred embodiment and as shown, the air brake testing apparatus of the invention further still includes a timer assembly which upon activation holds the first valve assembly in the second position and releases the first valve assembly to move from the second position to the first position upon the elapse of a predetermined time independently of the second valve assembly. This timer assembly provides a back-up to the remote control assembly, permitting the testing apparatus to be used in the timer-controlled mode.

In preferred embodiment and as shown, the testing apparatus includes a manually-operated selector switch for activating and deactivating the first valve assembly independently of the second valve assembly. All charging of the train brake pipe and all pressure reductions therein can thus be effectuated manually and independently of the second valve assembly. The second valve assembly as shown and in preferred embodiment operates only to hold the first valve assembly in the second position (while the brakes are being inspected in the applied position), and then upon receipt of a remotely transmitted signal, to release the brakes by closing the pilot valve whereby the release valve opens, opening the air line.

The present invention also includes a method of inspecting the air brakes of a made-up train employing an air brake testing apparatus of the invention. The method includes coupling an air brake testing apparatus between a supply of compressed air and the train brake pipe. The testing apparatus has an air line for establishing fluid communication between the compressed air supply and the train brake pipe, a first valve assembly movable between a first position opening the air line for releasing the brakes and a second position closing the air line for applying the brakes, and a second valve assembly movable upon receipt of an input signal from a remote signal transmitter to an activated position actuating the movement of the first valve assembly from the second position to the first position. Then the train brake pipe is initially charged to a release position through the test device, and thereafter the pressure in the train pipe is decreased to an applied position through the test device, preferably also monitoring the train brake pipe pressure while holding the pressure controls in a set position, all as described above. The brakes are then inspected in the applied position, the inspector walking down the length of the train from the location of the test apparatus, which is normally at the locomotive end of the train. The inspector then transmits an input signal using a remote signal transmitter to the second valve assembly, whereby the air line is open and the train brake pipe is charged to a release position. The inspector then inspects the brakes in the released position. When the second valve assembly includes a switch, a solenoid valve and an air valve, the testing apparatus is set prior to inspecting the brakes in the applied position by moving the switch to a valve-open position whereby the switch holds the air valve in an open position prior to the transmission of the input signal. Then upon the transmission of the input signal and the receipt of the input signal at the solenoid valve, the signal activates (energizes) the solenoid valve, closing the air valve through the switch, and opening the air line through the first valve assembly. Again in this method the initial charging of the train brake pipe and the reducing of pressure in the train brake pipe is effectuated through the selector switch, activating and deactivating the first valve assembly independently of the second valve assembly. The selector switch for activating and deactivating the first valve assembly independently of the second valve assembly, as shown and conveniently, is manually operated.

The above described embodiments are exemplitive, and the terminology is employed for illustration purposes and not limitation purposes. The present invention is not limited to the combinations and subcombinations illustrated herein.

We claim:

1. An air brake testing apparatus comprising:
    an air line for establishing fluid communication between a compressed air supply and a train brake pipe of a line of coupled train cars with air brakes to be tested;
    a first valve assembly;
    a second valve assembly, and
    a portable remote signal transmitter associated with said second valve assembly;
    said first valve assembly associated with said air line being movable between a first position opening said air line for release said brakes and a second position closing said air line for applying said brakes; and
    said second valve assembly controlled by said remote signal transmitter being movable upon receipt of an input signal from said remote signal transmitter to an activated position actuating the movement of said first valve assembly from said second position to said first position.

2. The air brake testing apparatus of claim 1, said second valve assembly including an air valve which moves from an open position to a closed position upon receipt of said input signal at said second valve assembly.

3. The air brake testing apparatus of claim 1, said second valve assembly including an electro-mechanical valve activated by said input signal.

4. The air brake testing apparatus of claim 1, said first valve assembly including a release valve actuated by a pilot valve, said pilot valve being actuated by said second valve assembly.

5. The air brake testing apparatus of claim 1, said first valve assembly including a release valve actuated by a pilot valve; and
    said second valve assembly including an electro-mechanical valve activated by said input signal and an air valve which moves from an open position to a closed position upon receipt of said input signal at said electro-mechanical valve, said pilot valve being actuated when said air valve moves to the closed position.

6. The air brake testing apparatus of claim 1, said first valve assembly including a release valve for opening and closing said air line, said release valve actuated by a pilot valve;
    said second valve assembly including a solenoid valve activated by said input signal, an air valve and a switch, said switch movable to a valve-open position holding said air valve in an open position and moved to a valve-closed position closing said air valve upon receipt of said input signal at said solenoid valve, said pilot valve being actuated when said air valve moves to the closed position.

7. The air brake testing apparatus of claim 1 further including a selector switch for activating and deactivating said first valve assembly independently of said second valve assembly.

8. The air brake testing apparatus of claim 1 further including a timer assembly which upon activation holds said first valve assembly in said second position and releases said first valve assembly to move from said second position to said first position upon the elapse of a predetermined time independently of said second valve assembly.

9. The air brake testing apparatus of claim 1 further including an outer housing harboring and providing a transport vehicle for said air line, said first valve assembly and said second valve assembly.

10. The air brake testing apparatus of claim 1, said first valve assembly including a release valve for opening and closing said air line, said release valve actuated by a pilot valve;
    said second valve assembly including a solenoid valve activated by said input signal, an air valve and a switch, said switch movable to a valve-open position holding said air valve in an open position and moved to a valve-closed position closing said air valve upon receipt of said input signal at said solenoid valve, said pilot valve being actuated when said air valve moves to the closed position, and
    further including a manually-operated selector switch for activating and deactivating said first valve assembly independently of said second valve assembly.

11. The air brake testing apparatus of claim 10 further including a timer assembly which upon activation holds said pilot valve in an open position whereby said release valve is held in a closed position, closing said air line, and closes said pilot valve effectuating the opening of said release valve upon the elapse of a predetermined time independently of said second valve assembly.

12. A method of inspecting the air brakes of a made-up train having a train brake pipe comprising the steps of:
    coupling an air brake testing apparatus between a supply of compressed air and said train brake pipe;
    said testing apparatus having an air line for establishing fluid communication between said compressed air supply and said train brake pipe, a first valve assembly, a second valve assembly, and a portable remote signal transmitter, said first valve assembly being movable between a first position opening said air line for releasing said brakes and a second position closing said air line for applying said brakes, and said second valve assembly being movable upon receipt of an input signal from said remote signal transmitter to an activated position actuating the movement of said first valve assembly from said second position to said first position;

initially charging said train brake pipe to a release position through said test device;

decreasing the pressure in said train pipe to an applied position through said test device, inspecting said brakes in said applied position;

transmitting an input signal from said remote signal transmitter to said second valve assembly to open said air line and charge said train brake pipe to a release position; and inspecting said brakes in said released position.

13. The method of claim 12, wherein said second valve assembly includes an air valve, further including transmitting said input signal to move said air valve from an open position to a closed position.

14. The method of claim 12 further including transmitting said input signal to activate an electro-mechanical valve within said second valve assembly.

15. The method of claim 12 further including transmitting said input signal to actuate a pilot valve within the first valve assembly through the activation of said second valve assembly, and said pilot valve upon actuation opens a release valve within the first valve assembly.

16. The method of claim 12 further including transmitting said input signal to activate an electro-mechanical valve within We second valve assembly to move an air valve within the second valve assembly from an open position to a closed position, activating a pilot valve within said first valve assembly which upon activation opens a release valve within the first valve assembly.

17. The method of claim 12, said second valve assembly includes a switch, a solenoid valve and an air valve, further including;

moving said switch to a valve-open position to hold said air valve in an open position prior to said transmission of said input signal, and transmitting said input signal to said solenoid valve to activate said solenoid valve, closing said air valve through said switch and opening said air line through said first valve assembly.

18. The method of claim 12, wherein said initial charging of said train brake pipe and said reducing of pressure in said train brake pipe is effectuated through a selector switch, activating and deactivating said first valve assembly independently of said second valve assembly.

19. The method of claim 12 further including manually operating a selector switch for activating and deactivating said first valve assembly independently of said second valve assembly.

20. The method of claim 12, said air brake testing device having an outer housing harboring said air line, said first valve assembly and said second valve assembly, further including, manually transporting said air brake testing device from or to a site of testing.

* * * * *